United States Patent [19]

Odake

[11] Patent Number: 4,925,690

[45] Date of Patent: May 15, 1990

[54] METHOD OF PREPARING VEGETABLE OR FRUIT JUICES

[75] Inventor: Yoshinobu Odake, Toyonaka, Japan

[73] Assignee: San-Ei Chemical Industries, Ltd., Toyonaka, Japan

[21] Appl. No.: 239,596

[22] Filed: Sep. 1, 1988

[30] Foreign Application Priority Data

Sep. 4, 1987 [JP] Japan ................. 62-222386

[51] Int. Cl.$^5$ ............................. A23L 2/02
[52] U.S. Cl. ................. 426/330.5; 426/425; 426/599
[58] Field of Search ........ 426/330.5, 599, 616, 426/15, 422, 425; 210/650, 652, 806, 641

[56] References Cited

U.S. PATENT DOCUMENTS

| | | | |
|---|---|---|---|
| 4,083,779 | 4/1978 | Combe et al. | 426/15 |
| 4,461,707 | 7/1984 | Thayer | 210/321.79 |
| 4,499,117 | 2/1985 | Bonneau | 426/15 |
| 4,643,902 | 2/1987 | Lawhon et al. | 426/599 |
| 4,724,080 | 2/1988 | Dau | 426/330.4 |
| 4,775,477 | 10/1988 | Stahl et al. | 210/641 |
| 4,781,837 | 11/1988 | Lefebvre | 210/641 |
| 4,828,705 | 5/1989 | Thakore | 210/651 |

FOREIGN PATENT DOCUMENTS

| | | | |
|---|---|---|---|
| 53-115660 | 10/1978 | Japan | 210/641 |
| 62-32866 | 2/1987 | Japan | 426/599 |
| 1294332 | 3/1987 | U.S.S.R. | 426/599 |

OTHER PUBLICATIONS

Porter 1971 Membrane Ultrafiltration. Chem. Tech., Jan. 1971, pp. 56-63.

*Primary Examiner*—Carolyn Paden
*Attorney, Agent, or Firm*—Sheldon Palmer

[57] ABSTRACT

A process for preparing vegetable or fruit juices which utilizes mcrofiltration followed by ultrafiltration and/or reverse osmosis, which can be practiced e.g., without entailing a reduction in filtration rate due to the contamination of the membrane, so that ultrafiltration or reverse osmosis unit can be smaller than the one conventionally used and can be cleaned with greater ease.

7 Claims, No Drawings

METHOD OF PREPARING VEGETABLE OR FRUIT JUICES

BACKGROUND OF THE INVENTION

1. Field of the Invention

The present invention relates to a method of preparing vegetable or fruit juices.

2. Description of the Prior Art

It is well known that vegetable juices and fruit juices are prepared by resorting to ultrafiltration (hereinafter abbreviated as "UF") and reverse osmosis (hereinafter abbreviated as "RO"). The squeezed fluid or extract is clarified by UF and concentrated primarily by RO.

The juice thus treated is very clear and retains the original taste, fragrance and color of the raw material free of degradation. The juice has the further feature that any of the taste, fragrance or color is selectively removable from the juice using a particular kind of membrane. These membrane filtration processes, however, have a common drawback. The filter membrane for UF or RO becomes clogged up thereby resulting in a reduced filtration rate or variations in filtration characteristics such as the molecular weight of the resulting fraction and sodium chloride removal ratio. The impaired performance of the membrane due to its contamination fails to realize the desired intended quality in respect of taste, fragrance, Brix, pigment content, etc. all owing to the variations in the membrane characteristics.

Accordingly, when the contamination of the membrane proceeds, there arises a need to discontinue the production for cleaning of the membrane, which entails a considerable time loss and a reduction in operation efficiency. Various devices have therefore been proposed, for example, for cleaning filter membranes with ease.

SUMMARY OF THE INVENTION

The present invention has been accomplished in view of the above situation. We have found that when the fluid to be made into a juice is treated by microfiltration before the treatment by UF and/or RO, lipids, proteins and like colloidal substances responsible for the contamination of the membrane can be removed from the fluid and thus result in an improved operating efficiency and other advantages.

The present invention provides a method of preparing a juice from a vegetable or fruit characterized in that the squeezed fluid or extract of the vegetable or fruit is subjected to microfiltration and thereafter to ultrafiltration and/or reverse osmosis.

The vegetable or fruit as the material to be treated according to the invention is not limited specifically. Examples of useful vegetables are cabbage, red cabbage, eggplant, tomato and the like. Examples of useful fruits are grape, elderberry, strawberry, apple, mandarin, peach, orange and the like. The term "squeezed fluid" refers to the fluid obtained by treating a vegetable or fruit by a usual method, for example, by cutting or milling the vegetable or fruit and roughly filtering the resulting fluid using a centrifugal separator equipped with filter cloth. An extract can be obtained by subjecting the cut or milled vegetable or fruit to extraction with a solvent (e.g. water) and roughly filtering the extracted fluid with filter cloth.

The term "microfiltration (MF)" refers to a filtration process wherein suspended particles, about 0.01 to several micrometers in size, are used in the form of a membrane for separation. With the present invention, it has been found desirable to use a microfiltration membrane capable of separating off fine particles of about 0.05 to about 0.6 micrometer. The pore size of such a membrane is preferably about 0.1 to about 0.4 micrometer. The microfiltration membrane to be used can be of the tubular type, capillary type, spiral type or hollow fiber type. Preferably, microfiltration is conducted by the cross-flow method wherein the prefilt is passed perpendicular to the direction of permeation of the filtrate. Examples of suitable microfiltration membranes are NTM-9002 (product of Nitto Electric Industrial Co., Ltd.), SF-501 (product of Kuraray Co., Ltd.), PW-303 (product of Asahi Chemical Industry Co., Ltd.), etc.

The MF operation of the invention is conducted usually under a pressure of 0.1 to 1.0 $kg/cm^2$ at a temperature of 20 to 30° C.

The MF operation of the invention chiefly removes lipids, proteins and like colloids, cell fragments, starch, etc. from the squeezed fluid or extract to be treated, as a result of which, the UF and/or RO operations can be subsequently carried out free of the contamination of the membrane that would otherwise lead to a reduced filtration rate.

Ultrafiltration (UF) is intermediate between MF and RO and is a pressure filtration process wherein separation is effected utilizing the difference in size between different molecules in a solution. The UF operation of the invention is conducted using a membrane which gives a fraction with a molecular weight of about 2000 to about 100,000, preferably about 5000 to about 100,000. Examples of useful ultrafiltration membranes are NTU-35100 and NTU-4220 (products of Nitto Electric Industrial Co., Ltd.), FUS-4081 (product of Daicel Chemical Industries Ltd.), VIP-3017 (product of Asahi Chemical Industry- Co., Ltd.), MU-6302V (product of Kuraray Co., Ltd.) and the like. Generally, it is desirable to conduct the UF operation of the invention under a pressure of 2.0 to 5.0 $kg/cm^2$ at a temperature of 20 to 30° C. This operation primarily removes proteins, dextrin, etc.

Reverse osmosis (RO) is a process wherein a reverse osmotic phenomenon is utilized for separating the solvent or a low-molecular-weight solute from a solution. The membrane to be used for the RO of the invention is preferably one which achieves a sodium chloride removal ratio of 10 to 98%. Examples of such membranes are NTR-7250 and NTR-7410 (products of Nitto Electric Industrial Co., Ltd.) and DRS-95 (product of Daicel Chemical Industries Ltd.). The RO operation is conducted preferably under a pressure of 10 to 30 $kg/cm^2$ at a temperature of 20 to 30° C. This operation is conducted mainly for desalination, deodorization and concentration.

The method of the invention includes the step of subjecting the squeezed fluid or extract to be treated i) to MF, thereafter to UF and subsequently to RO, ii) to MF and thereafter to UF, or iii) to MF and thereafter to RO. One of these steps is selected, for example, according to the kind of extract to be treated, or the concentration of the juice to be obtained.

The method of the invention can be practiced batchwise or continuously. The continuous method is desirable for producing large quantities of juices. The continuous method is practiced, for example, by a system comprising MF, UF and RO units, and tanks provided for the respective units and each communicating with the corresponding unit through a pipe. Each of the tanks is provided with a liquid level sensor for detecting the operating condition of the filtration unit (MF, UF or RO unit) to control the pressure to be applied to the unit, whereby the extract can be treated continuously.

The juice obtained by the present method is concentrated with heating or in a vacuum when so desired.

The method of the invention can be practiced without entailing a reduction in filtration rate due to the contamination of the membrane, so that the RO or UF unit can be smaller than the one otherwise, or conventionally employed and can be cleaned with greater ease. The method stably affords vegetable or fruit juices with the desired quality by selecting a particular membrane.

Furthermore, the juice prepared by the present invention can be subsequently concentrated by heating or in a vacuum as desired free of thermal degradation or without removal of volatiles, whereby a concentrated juice is made available inexpensively with good stability, with the taste substance, fragrance, pigment or the like of the vegetable or fruit retained or removed deliberately. Therefore, the juices produced according to the invention are very useful also as food additives.

For example, anthocyanin pigment contained in red cabbage has high stability and exhibits a beautiful color, whereas the red cabbage juice, if added as it is to food as a coloring agent, has a strong smell and taste which upset the original flavor balance of the food. The treatment of the invention nevertheless makes it possible to produce a red cabbage juice which is greatly diminished in taste and odor for use as a coloring agent. The concentrated juice of red cabbage thus prepared is usable as a natural pigment for coloring beverages, candies, jellies, pickles and other foods a brilliant purplish red without giving a disagreeable taste or odor to such food.

The process of the present invention is explained with the following examples.

EXAMPLE 1

Three hundred kg of red cabbage were cut and milled, and the resultant was roughly filtered using a centrifugal separator with filter cloth. The obtained squeezed fluid of red cabbage consisting of 120 l [10% $E_{\lambda max}^{1\ cm}=1.8$ (in Mcilvaine's buffer solution of pH 3.0) was microfiltered by the crossflow method using the MF membrane PW-303 (product of Asahi Chemical Industry Co., Ltd., diameter of micropores: 0.1 μm, capillary type] under an operating pressur of 0.1 kg/cm² at a temperature of 30° C., whereby a clear fluid of 100 l (10% $E_{\lambda max}^{1\ cm}=1.8$) was obtained.

The clear fluid was then treated by use of the RO membrane NTR-7410 (product of Nitto Electric Industrial Co., Ltd., sodium chloride removal ratio: 10%, spiral type) under an operating pressure of 10 kg/cm² at a temperature of 25° C., and thus 6 l of concentrated juice of red cabbage (10% $E_{\lambda max}^{1\ cm}=27.4$, pH 5.8) were obtained.

The juice was adjusted to pH 3.0 by adding citric acid, and further concentrated in vacuo to obtain 2 kg of the concentrated juice (10% $E_{\lambda max}^{1\ cm}=73.9$, pH 2.7).

Filtration using the reverse osmosis membrane in the above process gave rise to hardly any clogging of the membrane and permits filtration at a stable filtration rate. The change of odor, brix, etc. of the filtrate is only slight, and the obtained red cabbage concentrated juice has much pigment content and less odor and brix.

When a carbonated beverage prepared using the above concentrated juice was stored for 3 months, it had only a slight disagreeable taste and odor and retained its brilliant purplish red color.

| Prescription of the carbonated beverage | |
|---|---|
| Granulated sugar | 30 g |
| Liquid sugar | 25 g |
| Citric acid crystals | 1 g |
| Red cabbage juice | 1 g |
| to 100 ml by addition of deionized water | |

Forty ml of the resulting syrup were diluted with soda water into 200 ml, and the resultant was bottled and sterilized for 30 minutes at 60° C.

EXAMPLE 2

Three hundred kg of elderberry were crushed, and the resultant was filtered using a centrifugal separator with filter cloth to obtain 200 l of the squeezed fluid of elderberry (10% $E_{\lambda max}^{1\ cm}=32.4$).

The fluid was microfiltered using the MF membrane SF-501 (product of Kuraray Co., Ltd., the diameter of micropores: 0.5 μm, hollow fiber type) under an operating pressure of 2 kg/cm² at a temperature of 20° C. to obtain 180 l of a clear fluid (10% $E_{\lambda max}^{1\ cm}=27.6$, pH 3.4).

The resulting clear fluid was treated using the UF membrane NTU-35100 (product of Nitto Electric Industrial Co., Ltd., the molecular weight of the resulting fraction: 100,000, tubular type) under an operating pressure of 2 kg/cm² at a temperature of 25° C. The reverse osmosis filtration of the resultant was succeedingly carried out using the UF membrane DRS-95 (product of Daicel Chemical Industries, Ltd., the sodium chloride removal ratio: 95%, tubular type) under an operating pressure of 30 kg/cm² at a temperature of 25° C., whereby 80 l of a concentrated juice (10% $E_{\lambda max}^{1\ cm}=54.2$, pH 2.8, brix 20°) were obtained.

This elderberry concentrated juice retained well its fragrant substance, taste and the like. Further, fruit drinks prepared using the above juice have the flavor characteristic of elderberry and retained brilliant purplish red color even after one month.

| Prescription of the beverage | |
|---|---|
| Granulated sugar | 12.5 g |
| Citric acid crystals | 0.2 g |
| Elderberry concentrated juice | 5 g |
| To 100 ml by addition of deionized water | |

The above beverage was bottled and sterilized for 10 minutes at 80° C.

COMPARABLE EXAMPLE 1

When 100 ml of the squeeze fluid of elderberry obtained in Example 2 was subjected to the same treatments using the UF membrane and the RO membrane as those carried out in Example 2 with omission of the treatment using the MF membrane, at the time when about 10 l of the filtrate was obtained through the UF membrane, the UF membrane became completely clogged.

COMPARABLE EXAMPLE 2

When 50 ml of the squeezed fluid of red cabbage obtained in Example 1 was subjected to the same treatment using the RO membrane as that carried out in Example 1 with omission of the treatment using the MF membrane, the filtration rate lowered to about a third of that in Example 1 at an early time and finally to about a fifth of it, and yet the obtained concentrated juice had much precipitate and did not meet the requirements of a pigment additive.

What we claim is:

1. A process for preparing a vegetable or fruit juice which comprises subjecting a vegetable or fruit squeezed fluid or extract to microfiltration and thereafter to at least one of ultrafiltration and reverse osmosis.

2. A process of claim 1 in which the microfiltration is conducted by a membrane having a pore size of 0.1 to 0.4 micrometer.

3. A process of claim 1 in which the ultrafiltration is conducted by a membrane having a molecular weight cutoff ranging from 2000 to 100,000.

4. A process of claim 1 in which the reverse osmosis is conducted by a membrane which achieves a sodium chloride removal ratio of 10 to 98%.

5. A process of claim 1 in which the microfiltration, and said at least one of ultrafiltration and reverse osmosis is continuously conducted.

6. A process of claim 1 in which the resultant after the filtration is further concentrated with heating or in vacuo.

7. A process of claim 1 in which the vegetable squeezed fluid is red cabbage juice or elderberry juice.

* * * * *